United States Patent

[11] 3,624,812

| [72] | Inventors | Jose Rosan, Sr.<br>San Juan Capistrano;<br>Robert D. Weber, Costa Mesa; Marvin P. Reece, Dana Point; William A. Knoll, Santa Ana, all of Calif. |
|---|---|---|
| [21] | Appl. No. | 57,048 |
| [22] | Filed | July 22, 1970 |
| [45] | Patented | Nov. 30, 1971 |
| [73] | Assignee | Rosan Engineering Corp.<br>Newport Beach, Calif.<br>Continuation-in-part of application Ser. No. 785,141, Dec. 19, 1968, now abandoned. This application July 22, 1970, Ser. No. 57,048 |

[54] REPLACEABLE BULKHEAD CONNECTOR TUBE
22 Claims, 23 Drawing Figs.

[52] U.S. Cl................................................. 285/161,
285/202, 285/206

[51] Int. Cl.................................................. F16l 5/02
[50] Field of Search....................................... 285/161,
92, 128, 202, 205, 206, 189

[56] References Cited
UNITED STATES PATENTS

| 2,444,145 | 6/1948 | Rosan........................... | 285/202 X |
| 2,452,262 | 10/1948 | Rosan........................... | 285/202 X |
| 2,992,018 | 7/1961 | Rosan........................... | 285/161 X |
| 3,200,366 | 8/1965 | Stuart........................... | 285/161 X |
| 3,376,053 | 4/1968 | Novakovich et al.......... | 285/92 |
| 3,395,934 | 8/1968 | Rosan et al................... | 285/92 X |

Primary Examiner—David J. Williamowsky
Assistant Examiner—Wayne L. Shedd
Attorney—Roman A. Di Meo ABSTRACT: A replaceable leakproof connector tube for passing electrical cables and the like therethrough which utilizes a mechanical antirotational lock for securing the same to workpieces and a compression member to seal the same against leakage.

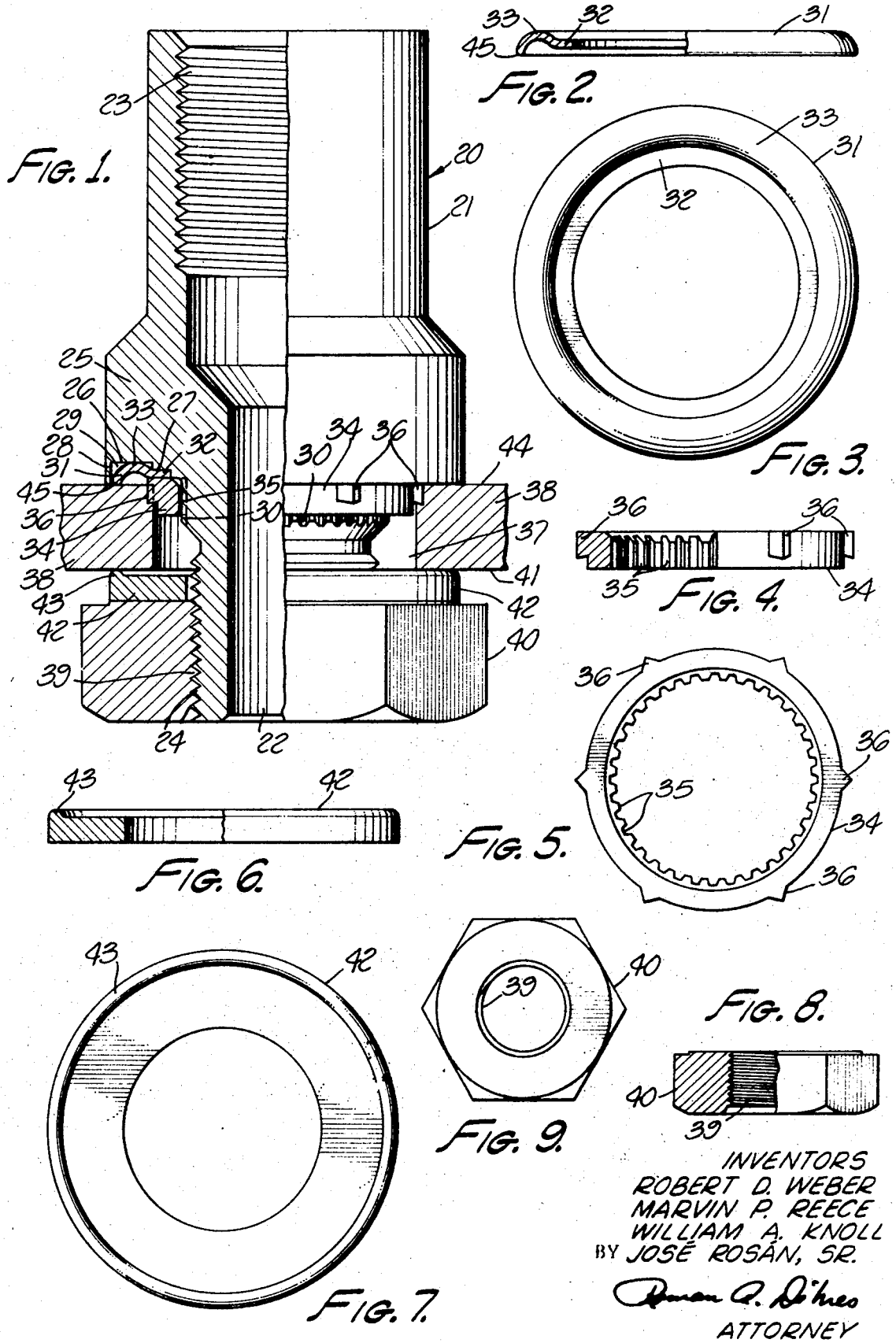

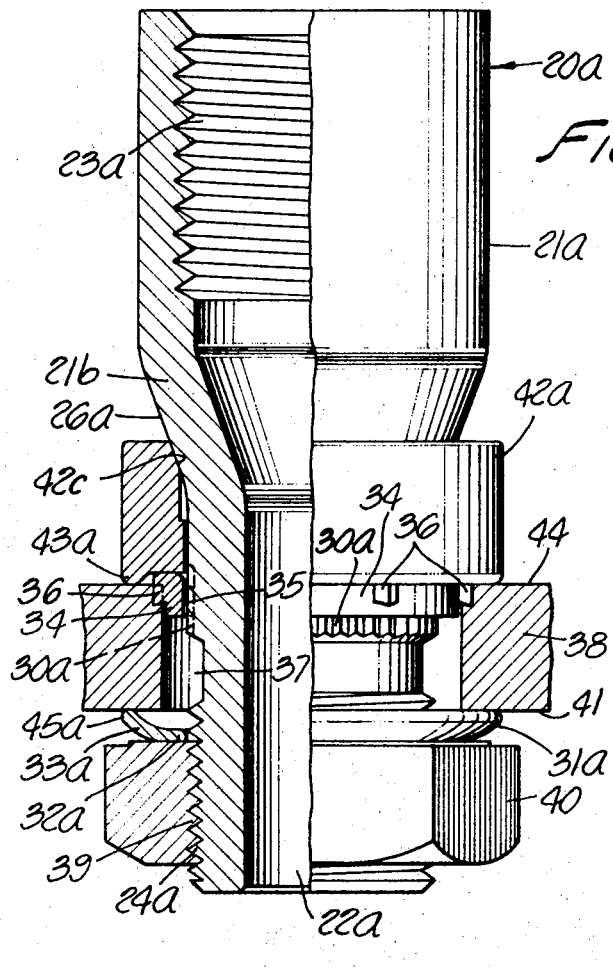
Fig. 10.
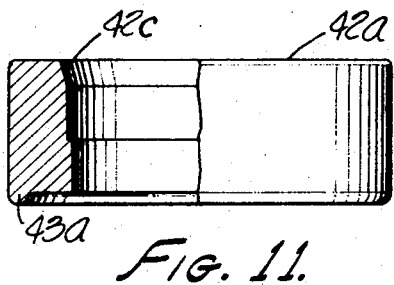
Fig. 11.
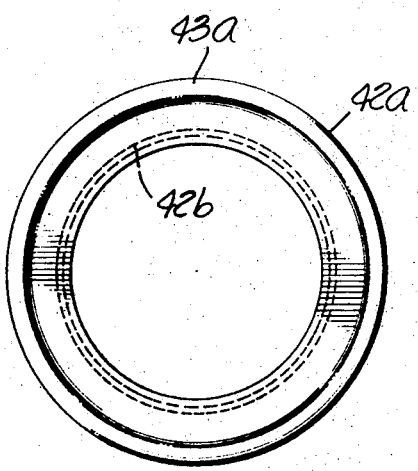
Fig. 12.
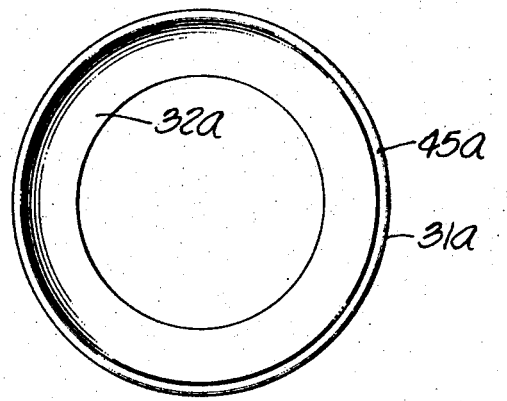
Fig. 13.
Fig. 14.
INVENTORS
ROBERT D. WEBER
MARVIN P. REECE
WILLIAM A. KNOLL
BY JOSÉ ROSÁN, SR.
ATTORNEY

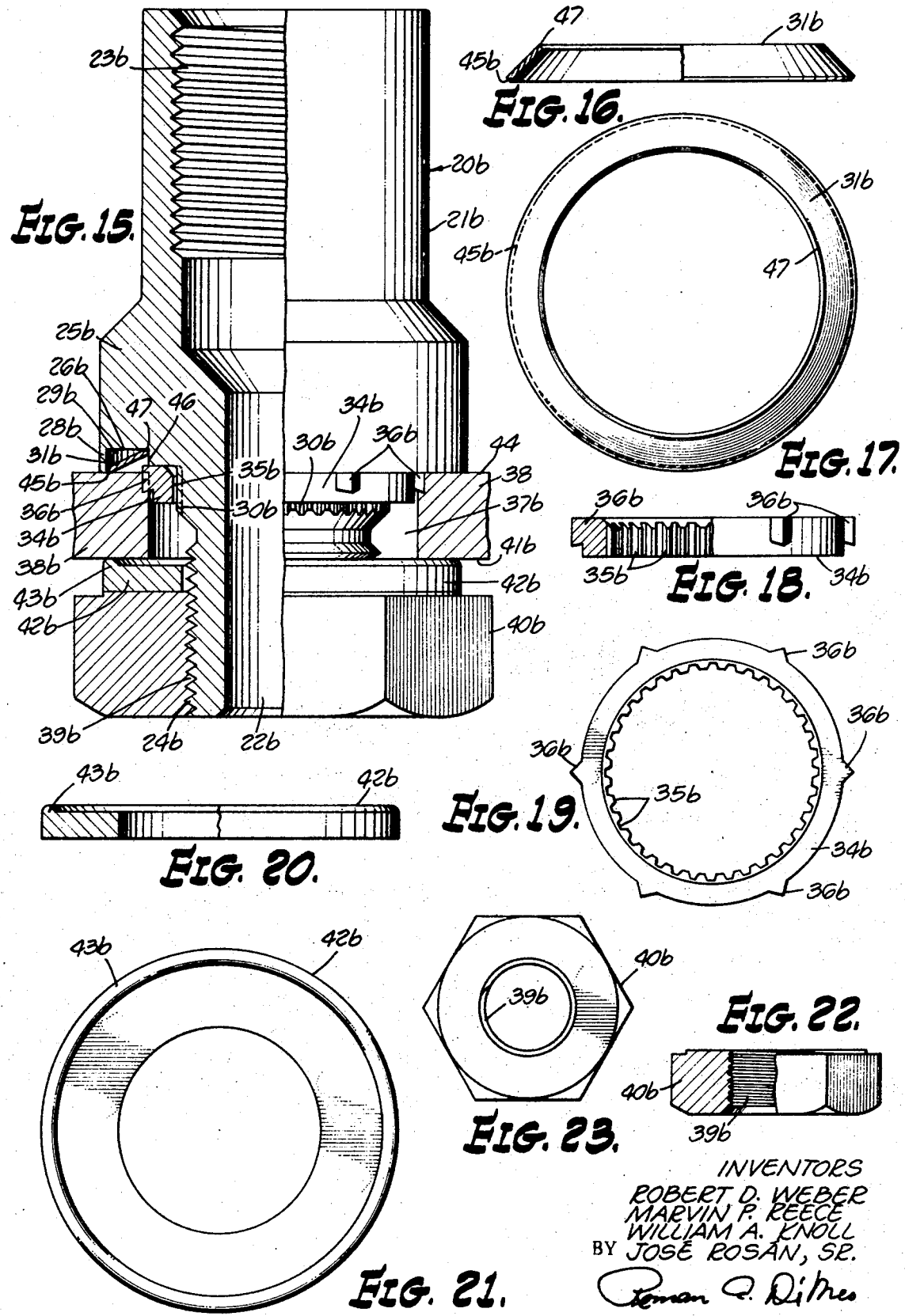

REPLACEABLE BULKHEAD CONNECTOR TUBE

This application is a continuation-in-part of my copending application Ser. No. 785,141, filed Dec. 19, 1968, and now abandoned.

A requirement has long existed for usage of a great number of connector tubes which are used for passing electrical cables and other conduits through walls and floors (for facility hereinafter referred to as workpiece). Of necessity, these connector tubes must not diminish the integrity of the workpiece structure through which they pass relative to fluid or vapor leakage resistance.

In the past, the connector tube body has been welded to the workpiece. While the welded joint proved satisfactory as a sealing means, it was also cumbersome and expensive in view of the great number of connector tubes used and the amount of time involved in welding each of these tubes. This is particularly true since these tubes are generally placed in close proximity to each other so as to make repair, replacement or rearrangement an extremely time consuming and expensive process.

Although over the years a considerable amount of time and effort has been expended to eliminate the aforesaid problems associated with the use of welded, bolted and gasketed connector tubes, no satisfactory solution has been obtained. The replaceable connector tube of the instant application is capable not only of being tightly and securely locked to a workpiece, but can be readily replaced with simple tools.

The connector tube of the instant invention is comprised of a substantially tubular body element having internal threads at one end thereof and external threads at the opposite end. A laterally extending portion of the body element providing a compression member is positioned between the ends of the body element radially extending therefrom. Between the externally threaded end and the compression member provided by the body element are situated a plurality of longitudinally extending peripheral serrations.

An annular locking ring having internal serrations and a plurality of circumferentially spaced teeth on the outer periphery thereof is positioned so that the aforesaid internal serrations thereof are in cooperating interengagement with the serrations of the body element. A flexible compressing sealing ring is intimately secured between the locking ring and compression member of the body element.

On the opposite side of the workpiece through which the connector tube is situated, a retaining and tensioning nut member is threadedly engaged with the end of the body element. Secured between the nut member and the surface of the workpiece is a sealing washer having a continuous projecting protuberance extending from one face thereof, positioned adjacent the edge of the washer in tight association with said workpiece surface.

The connector tube of the instant invention is used by placing the sealing ring and the locking ring, in that order, about the externally threaded end of the body element. This subassembly is inserted into the opening in the workpiece so that the external teeth spaced about the circumference of the locking ring are seated on the edge of the structure surface adjacent the opening therein. The sealing washer and retaining nut are then placed and threaded, respectively, in the threaded end of the body element projecting through and beyond the aforesaid opening in the workpiece.

Upon the threading and tightening of the retaining nut, the external teeth of the locking ring are embedded into the workpiece about the edge of the opening therethrough. This prevents the locking ring from subsequent rotational movement relative to the workpiece. Since the internal serrations of the locking ring are interengaged with the external body element serrations, the body element is also prevented from subsequent rotational movement. It should be noted that the external body element serrations may be formed prior to installing the locking ring, or formed by the broaching action of the internal locking ring serrations simultaneously during the displacement of the locking ring due to the tightening of the retaining nut.

Concurrently with the foregoing, the flexible sealing ring is tightly compressed between the compression member of the body element and the surface of the workpiece thereby providing a mechanical seal. At the same time, the protuberance of the sealing washer is embedded into the opposite surface of the workpiece thereby creating a second mechanical seal. Thus not only is a double-locking action created, but a stress limiting means which diminishes and retards any stress concentration patterns that may result due to the broaching action of the locking ring into the workpiece.

In order to provide a positive "stop" to the body element so as to insure that the same is not drawn through the workpiece opening upon the application of an excessive torquing force to the retainer nut, a stop sleeve is positioned about the periphery of the compression member and extending longitudinally therefrom so as to engage the surface of the workpiece upon the application of the torquing force to the retainer nut. Such a stop sleeve further serves the function of eliminating the possibility of canting the tube by an inadvertent lateral blow or the like thereby damaging the sealing properties of the connector tube after it is once installed.

An alternative embodiment of the instant invention utilizes a body element which can be drawn from tube stock rather than machined or cast. The compression member provided by the body element is then comprised of an outwardly expanded portion of the exterior of the tube wall, as compared to an annular flange provided by the machined body element.

In this embodiment, the sealing washer which is slightly modified, is in intimate contact with the compression member and the protuberance thereof is forced into the workpiece surface adjacent the locking ring. Further, the sealing ring in this embodiment which is also slightly modified is positioned between the retainer and tensioning nut so that it is flexed tightly against the opposite side of the workpiece.

In all other respects the alternate embodiment and the remaining elements thereof, i.e., locking ring and retaining and tensioning nut are similar to and perform the same functions in the same manner as the first mentioned embodiment.

It is evident that not only is there provided a connector tube which is mechanically locked into a workpiece, but there is also provided an integral means for limiting and diminishing stress concentration which may occur during the use thereof.

Accordingly, the principal object of the invention is to provide a replaceable connector tube which is mechanically locked to a workpiece without the use of welding, bolts or gaskets.

Another object is to provide a replaceable connector tube which is mechanically locked to a workpiece and provides means for limiting and diminishing stress concentrations in the workpiece during the use thereof.

Still another object is to provide a replaceable connector tube which has a plurality of mechanical seals.

A further object is to provide a replaceable connector tube which can be quickly and easily installed by the use of simple tools.

Yet another object is to provide a replaceable connector tube which can be installed in closely situated clusters.

Other objects and advantages of the present invention will be apparent from the following description taken in conjunction with the accompanying drawings, in which:

FIG. 1 is an elevational view, partly sectioned, of the replaceable connector tube of the instant invention completely installed in an aperture passing through a workpiece;

FIG. 2 is a side elevational view, partly sectioned, of the sealing ring shown in FIG. 1;

FIG. 3 is a top plan view of the sealing ring shown in FIG. 2;

FIG. 4 is a side elevational view, partly sectioned, of the locking ring shown in FIG. 1;

FIG. 5 is a top plan view, partly sectioned, of the locking ring of FIG. 4;

FIG. 6 is a side elevational view, partly sectioned, of the sealing washer shown in FIG. 1;

FIG. 7 is a top plan view of the sealing washer of FIG. 6;

FIG. 8 is a reduced side elevational view, partly sectioned, of the retainer and tensioning nut shown in FIG. 1;

FIG. 9 is a top plan view of the nut of FIG. 8;

FIG. 10 is an elevational view, partly sectioned, of another embodiment of an assembled and installed connector tube of the instant invention;

FIG. 11 is a side elevational view, partly sectioned, of the sealing ring shown in FIG. 10;

FIG. 12 is a bottom plan view of the sealing ring of FIG. 11;

FIG. 13 is a side elevational view, partly sectioned, of the sealing washer shown in FIG. 10;

FIG. 14 is a top plan view of the sealing washer of FIG. 13;

FIG. 15 is an elevational view, partly sectioned, of the replaceable bulkhead connector tube shown in FIG. 1 except that the sealing ring is a toggle seal spring;

FIG. 16 is a side elevational view, partly sectioned, of the sealing ring shown in FIG. 15;

FIG. 17 is a top plan view of the sealing ring shown in FIG. 16;

FIG. 18 is a side elevational view, partly sectioned, of the locking ring shown in FIG. 15;

FIG. 19 is a top plan view, partly sectioned, of the locking ring of FIG. 18;

FIG. 20 is a side elevational view, partly sectioned, of the sealing washer shown in FIG. 15;

FIG. 21 is a top plan view of the sealing washer of FIG. 20;

FIG. 22 is a reduced side elevational view, partly sectioned, of the retainer and tensioning nut shown in FIG. 15; and FIG. 23 is a top plan view of the nut of FIG. 22.

Referring more particularly to FIG. 1, reference numeral 20 designates generally the connector tube of the instant invention which is comprised of body 21 having an internal cavity 22 passing therethrough. Internal threads 23 and external threads 24 are situated on opposite ends of body 21. A compression member comprised of annular flange 25 is carried by body 21 which is provided with a pressure or compression surface 26 and a securement surface 27.

An extension or sleeve portion 28 longitudinally extends beyond annular flange 25 so as to provide annular cavity 29. This sleeve portion 28 may be integral to flange 25 as shown here, or separately attached, but in any event may be circumferentially continuous or intermittent about the flange.

A plurality of longitudinally extending serrations 30 are positioned about the periphery of body 21. As aforesaid, serrations 30 may be formed prior to the assembling of the locking ring or may be broached into body 21 by the serrations of the locking ring during the displacement of the locking ring upon the installation of the connector tube, as will hereinafter be more fully explained.

Sealing ring 31 is provided with a flat securement portion 32 and a flexible portion 33. Curved portion 33 is accommodated in annular cavity 29 created by sleeve portion 28. It should be noted that flat securement portion 32 may be eliminated from sealing ring 31 without deviating from the scope of the invention herein. If it is desired to eliminate flat securement portion 32 as aforesaid, the curvature of flexible portion 33 may have a lesser radius so that the external edge 45 of sealing ring 31 is in tight engagement with the forward edge of sleeve 28 and of the workpiece surface, and the opposite edge of sealing ring 31 is compressed in tight engagement with the intersection of the upper and internal walls of the annular cavity 29. (See FIGS. 15 through 17.)

Locking ring 34 abuts against flat securement portion 32 of sealing ring 31 so as to compress said flat portion against securement surface 27 of flange 25 thereby securing the flat portion of the sealing ring therebetween. Locking ring 34 is provided with a plurality of longitudinally extending internal serrations 35 and a plurality of circumferentially spaced broaching teeth 36 on the external periphery thereof. As hereinabove mentioned, if it is desired to eliminate the necessity of forming body serrations 30 prior to assembling the locking ring to the connector tube, said serrations 30 may be formed on the external periphery of body 21 by the internal serrations 35 of the locking ring simultaneously during the displacement of the locking ring due to the tightening of the retaining and tensioning nut.

External threads 24 which are situated on the end of body 21 passing through aperture 37 of workpiece 38 are threadedly engaged with the threads 39 of the retainer and tensioning nut 40. Interposed between nut 40 and surface 41 of workpiece 38 is sealing washer 42 which is provided with a continuous circumferential protuberance 43 extending from the washer surface adjacent the peripheral edge thereof.

Accordingly, as tension nut 40 is threaded onto threads 24 of body 21, the circumferential protuberance 43 of sealing washer 42 is forced into tight engagement with surface 41 of workpiece 38. Simultaneously with this action, body 21 is drawn through aperture 37 of workpiece 38 so that compression surface 26 of flange 25 compresses securement portion 32 of sealing ring 31 against the upper surface of locking ring 34. Concurrently, locking ring 34 which was initially seated upon surface 44 of workpiece 38 adjacent aperture 37 by virtue of external broaching teeth 36, is displaced into aperture 37. As a result, broaching teeth 36 are drawn into the surface adjacent aperture 37 by their broaching action, thereby becoming embedded in workpiece 38. At the same time internal serrations 35 of locking ring 34 become interengaged with external serrations 30 of body 21 or embedded into the outer wall of body 21 so as to form serrations 30, depending upon the prior presence of serrations as hereinbefore mentioned.

The embedment of external broaching teeth 36 of locking ring 34 into workpiece 38 will prevent subsequent rotation of the locking ring relative to the bulkhead. Further, due to the simultaneous interengagement of internal serrations 35 of said locking ring with external serrations 30 of body 21, subsequent rotational movement of body 21 relative to the workpiece is also prevented, thereby mechanically locking connector tube 20 securely to said workpiece.

During this action compression surface 26 of flange 25 deflects flexible curved portion 33 of sealing ring 31 so that the external edge 45 of sealing ring 31 is forced into intimate contact with surface 44 of workpiece 38. It should be noted that edge 45 of sealing ring 31 contacts surface 44 of workpiece 38 longitudinally opposite the contact of protuberance 43 of sealing washer 42 with surface 41 of said workpiece 38. This is an additional feature of the invention in that a stress rise limiter is created whereby any stresses which may be created by the embedding of external broaching teeth 36 of locking ring 34 into surface 44 of workpiece 38 is retarded and diminished.

Although pulling body 21 through aperture 37 of workpiece 38 may be curtailed at any predetermined position, to insure that the foregoing is terminated at a maximum or positive point, the displacement of body 21 will be prohibited from further occurring upon contact of sleeve portion 28 with surface 44 of workpiece 38. This contact of workpiece 38 with sleeve 28 further provides canting stability which assists in preventing bending, etc. of body 21 upon the inadvertent application of a lateral force thereon.

Internal threads 23 of body 21 are provided to threadedly engage connecting members thereto (not shown).

An alternate embodiment of the instant invention is illustrated in FIGS. 10 through 14 wherein body 21a of tube connector 20a is provided with a portion hereof having a diameter greater than the remaining portion so that the wall 21b of body 21a outwardly tapers to form a compression surface 26a. Body 21a may be machined, cast, or formed from a drawn tube having a portion thereof outwardly swaged. Regardless of the manner of forming body 21a, said body is provided with internal threads 23a, external threads 24a, an internal cavity 22a and longitudinally extending external serrations 30a.

Sealing washer 42a is provided with a circumferential protuberance 43a extending from the edge of one face thereof adjacent the periphery thereof. A beveled contact surface 42c is concentrically provided about the inner opening of the washer, which is in intimate engagement with compression surface 26a. The face of sealing washer 42a adjacent circumferential protuberance 43a is in contact with the upper surface of locking ring 34 shown in FIGS. 4 and 5. As was the case with respect to the embodiment illustrated in FIG. 1, internal serrations 35 are interengaged with body serrations 30a.

A sealing ring 31a having a flat portion 32a and a flexible curved portion 33a is positioned about the externally threaded portion of body 21a. The tensioning nut 40 of FIGS. 8 and 9 is threadedly engaged with the externally threaded portion of body 21a.

Thus, as tensioning nut 40 is threaded onto body 21a said body is drawn through aperture 37 of workpiece 38 so that compression surface 26a exerts a force upon contact surface 42c of sealing washer 42c thereby forcing protuberance 43a of said sealing washer into tight engagement with surface 44 of workpiece 38. Simultaneously the face of sealing washer 42a adjacent protuberance 43a displaces locking ring 34 into aperture 37 of workpiece 38 so that broaching teeth 36 positioned about the periphery of locking ring 34 (which are initially seated on surface 44 of workpiece 38) bite into and become embedded in the material of the workpiece. It is thus evident that locking ring 34 is prohibited from subsequent rotational movement. Due to the interengagement of internal serrations 35 of the locking ring with the external serrations 30a of body 21, said body is concomitantly also prohibited from subsequent rotational movement, thereby mechanically locking connector tube 20a to workpiece 38. Concurrent with this action the under surface of retaining and tension nut 40 exerts a pressure upon sealing ring 31a so that the latter is compressed, thereby causing the external edge 45a thereof to be in tight engagement with surface 41 of workpiece 38.

It should again be noted that the contact of workpiece surface 44 of protuberance 43a of sealing washer 42a is longitudinally opposite external edge 45a of sealing ring 31a after the latter is compressed, thereby creating a stress limiter so as to diminish any stress concentrations in workpiece 38 adjacent aperture 37 which may occur due to the broaching action of broaching teeth 36 of locking ring 34 into the workpiece.

In all other respects the alternate embodiment of the instant invention illustrated in FIG. 10 functions as does the embodiment shown in FIG. 1.

FIGS. 15 through 23 illustrate another embodiment of the instant invention which is identical to that illustrated in FIG. 1 except that annular cavity 29b of body 21b is not provided with a securement surface (such as 27 in FIG. 1) and the inner wall 46 of annular cavity 29b extends to the same longitudinal length as sleeve portion 28b. Further, sealing ring 31b is a toggle seal spring having the form of a truncated conical ring.

Sealing ring 31b is positioned in annular cavity 29b so that external edge 45b is positioned in the juncture of sleeve portion 28b and surface 44 of workpiece 38. The inner edge 47 of sealing ring 31b is positioned in the juncture of inner wall 46 of annular cavity 29b and the compression surface 26b of said cavity. Thus, as the connector tube 20b is installed (similarly as that of FIG. 1), external edge 45b and internal edge 47 of sealing ring 31b are compressed in the respective junctures in which they are located so that a tight mechanical seal results. All other elements of the embodiment shown in FIGS. 15 through 23 are similar in function and design to those shown in FIG. 1 and are therefore identified with the same reference numeral except having an addition of the subletter b.

While several embodiments of the invention have been described, it is understood that the particular embodiments of the invention herein disclosed are for illustrative purposes only and that various changes may be made therein without departing from the principles of the invention.

We claim:

1. A replaceable connector tube for use in a workpiece comprising:
   a hollow body, said body provided with internal and external threads, said body having an externally outwardly extending body portion which forms a compression surface, said body having a plurality of external engagement means;
   a locking ring positioned about said body, said locking ring having internal engagement means which interengage with the external engagement means carried by said body, said locking ring provided with a plurality of broaching teeth about the outer periphery thereof;
   a sealing ring positioned about said body, said sealing ring being flexible and having at least one continuous annular edge;
   a sealing washer positioned about said body, said sealing washer provided with a continuous ridge longitudinally protruding from one face thereof; and
   a tightening and retaining means provided with internal threads, threadingly engaged with the external threads carried by said body.

2. The replaceable connector tube as defined in claim 1, wherein the externally outwardly extending body portion is an annular flange.

3. The replaceable connector tube as defined in claim 2, wherein said annular flange is extended to form a longitudinally projecting stop means and an annular groove.

4. The replaceable connector tube as defined in claim 1, wherein the engagement means of the body and the engagement means of the locking ring are interengaged longitudinally extending serrations.

5. The replaceable connector tube as defined in claim 1, wherein the sealing ring is positioned between the compression surface of the externally outwardly extending body portion and the locking ring.

6. The replaceable connector tube as defined in claim 1, wherein the sealing ring has a flexible curved portion in intimate contact with the compression surface of the body and a continuous annular edge adjacent the outer edge of the outwardly extending body portion so that said edge is in tight engagement with the workpiece surface after the compression of the sealing ring.

7. The replaceable connector tube as defined in claim 3, wherein the sealing ring is a truncated conical ring having inner and outer edges, said inner edge being in intimate contact with the juncture of the compression surface of the body and the inner wall of the groove and the outer edge of said ring is positioned adjacent the forward edge of the longitudinally projecting stop means so that said outer edge of said ring is in tight engagement with the workpiece surface after the compression of the sealing ring.

8. The replaceable connector tube as defined in claim 1, wherein the sealing washer is compressed between the tightening and retaining means and the surface of the workpiece so that the continuous ridge thereof is in tight abutment with said surface.

9. The replaceable connector tube as defined in claim 8, wherein the continuous ridge longitudinally protruding from one face of the sealing washer is longitudinally opposite the continuous annular edge of the sealing ring after the latter is flexed.

10. The replaceable connector tube as defined in claim 1, wherein the externally outwardly extending body portion is comprised of an expanded portion of the body wall.

11. The replaceable connector tube as defined in claim 10, wherein the sealing ring is positioned between the tensioning and retaining means and the surface of the workpiece.

12. The replaceable connector tube as defined in claim 11, wherein the sealing ring has a flexible curved portion which is in intimate contact with the tensioning and retaining means and a continuous annular edge is situated at the opposite end of the ring so that said edge is in tight engagement with the workpiece surface after the compression of the sealing ring.

13. The replaceable connector tube as defined in claim 10, wherein the sealing washer is provided with a beveled portion so as to form a compression surface which is engaged with the compression surface of the externally outwardly extending body portion.

14. The replaceable connector tube as defined in claim 13, wherein the sealing washer is positioned in abutting engagement between the externally outwardly extending body portion and the locking ring.

15. The replaceable connector tube as defined in claim 14, wherein the continuous ridge longitudinally projecting from the sealing washer is in tight abutment with the surface of the workpiece adjacent the locking ring.

16. The replaceable connector tube as defined in claim 4, wherein the externally outwardly extending body portion is an annular flange, the sealing ring is positioned between the compression surface of said externally outwardly extending body portion and the locking ring, and the sealing washer is compressed between the tightening and retaining means and the surface of the workpiece so that the continuous ridge thereof is in tight abutment with said surface.

17. The replaceable connector tube as defined in claim 16, wherein the sealing ring has a flexible curved portion which is in intimate contact with the compression surface of the body so that said flexible curved portion is deflected and the continuous annular edge thereof is in tight engagement with the workpiece surface after the compression of the sealing ring, and wherein the continuous ridge protruding from one face of the sealing washer is longitudinally opposite the continuous annular edge of the sealing ring after the latter is flexed.

18. The replaceable connector tube as defined in claim 3, wherein the engagement means of the body and the engagement means of the locking ring are interengaged longitudinally extending serrations.

19. The replaceable connector tube as defined in claim 18, wherein the externally outwardly extending body portion is an annular flange, the sealing ring is positioned between the compression surface of said externally outwardly extending body portion and the locking ring, and the sealing washer is compressed between the tightening and retaining means and the surface of the workpiece so that the continuous ridge thereof is in tight abutment with said surface.

20. The replaceable connector tube as defined in claim 19, wherein the sealing ring is a truncated conical ring having inner and outer edges, said inner edge being in intimate contact with the juncture of the compression surface of the body and the groove wall and the outer edge of said ring is adjacent the forward end of the longitudinally projecting stop means so that said outer edge of said ring is in tight engagement with the workpiece surface after the compression of the sealing ring and wherein the continuous ridge protruding from one face of the sealing washer is longitudinally opposite the continuous annular edge of the sealing ring after the latter is flexed.

21. The replaceable connector tube as defined in claim 4, wherein the externally outwardly extending body portion is comprised of an expanded portion of the body wall, the sealing ring is positioned between the tensioning and retaining means and the workpiece surface, the sealing washer is provided with a beveled portion so as to form a compression surface which is engaged with the compression surface of the externally outwardly extending body portion, and said sealing washer is positioned in abutting engagement between the externally outwardly extending body portion and the locking ring.

22. The replaceable connector tube as defined in claim 21, wherein the curved flexible portion of the sealing ring has a flexible curved portion which is in intimate contact with the tensioning and retaining means so that said flexible portion is deflected and the continuous annular edge thereof is in tight engagement with the workpiece surface after the compression of the sealing ring and wherein the continuous ridge longitudinally projecting from the sealing washer is in tight abutment with the opposite surface of the workpiece and longitudinally opposite the continuous annular edge of the sealing ring after the latter is flexed.

* * * * *